(12) United States Patent
Zhang et al.

(10) Patent No.: US 8,837,316 B2
(45) Date of Patent: Sep. 16, 2014

(54) RTT BASED RANGING SYSTEM AND METHOD

(75) Inventors: Xiaoxin Zhang, Sunnyvale, CA (US); Ning Zhang, Saratoga, CA (US)

(73) Assignee: QUALCOMM Incorporated, San Diego, CA (US)

( * ) Notice: Subject to any disclaimer, the term of this patent is extended or adjusted under 35 U.S.C. 154(b) by 229 days.

(21) Appl. No.: 13/523,457

(22) Filed: Jun. 14, 2012

(65) Prior Publication Data

US 2013/0336131 A1 Dec. 19, 2013

(51) Int. Cl.
| | |
|---|---|
| H04J 3/06 | (2006.01) |
| H04B 17/00 | (2006.01) |
| H04W 24/00 | (2009.01) |
| H04B 15/00 | (2006.01) |
| H04W 64/00 | (2009.01) |
| G01S 13/76 | (2006.01) |

(52) U.S. Cl.
CPC .............. *H04W 24/00* (2013.01); *H04W 64/00* (2013.01); *G01S 13/765* (2013.01)
USPC ........ 370/252; 370/350; 370/503; 455/67.11; 455/67.16; 455/456.2; 455/502

(58) Field of Classification Search
CPC . H04W 52/0219; H04W 84/18; H04W 24/00; H04W 64/00; H04W 56/0015; H04W 56/0065; H04W 28/04; H04W 64/003; H04W 84/12; H04W 52/48; H04W 56/003; H04W 56/0045; H04W 56/0055; H04W 72/0406; H04W 56/007; H04W 56/0075; H04W 56/008; H04W 56/0095; H04W 72/085; H04W 36/0088; H04W 36/0094; H04W 36/30; H04W 40/125; H04W 56/00; H04W 56/0025; H04W 74/0891; H04W 72/0426; H04W 88/00; H04W 92/10; H04W 4/02; H04W 4/023; H04W 4/025; H04W 28/0226; H04W 36/32; H04W 40/20; H04W 48/04; H04W 16/18; H04W 56/0035; H04Q 2213/13372; G01S 19/46; G01S 5/02; G01S 5/14; H04B 7/0617; H04B 7/2693; H04B 17/0042; H04B 17/0057; H04B 17/0077; H04H 20/67; H04J 3/0632; H04J 3/0664; H04J 3/0682; H04J 3/0685; H04J 3/0688; H04L 1/0026; H04L 7/042; H04L 12/2697; H04L 29/08657; H04L 43/00; H04L 43/50; H04L 43/0852; H04L 47/10; H04N 21/4305
USPC ........... 370/252, 350, 503; 455/67.11, 67.16, 455/456.2, 502

See application file for complete search history.

(56) References Cited

U.S. PATENT DOCUMENTS

| | | |
|---|---|---|
| 5,812,528 A | 9/1998 | Vandervort |
| 7,512,113 B2 | 3/2009 | Luaces |

(Continued)

FOREIGN PATENT DOCUMENTS

WO WO 2011/018751 A1 2/2011

OTHER PUBLICATIONS

"Proposed 802.11v "Timing Measurement" changes and implications to 802.1 AS Kevin Stanton Intel Corporation May 13, 2008 as-stanton-overview- of-wireless-1 as-for-8021-eilat-05-08", IEEE Draft; AS-Stanton-Overview-Of-Wireless-1ASFOR-8021-Eilat-05-08, IEEE-SA, Piscataway, NJ USA, vol. 802.1, May 13, 2008, pp. 1-12, XP017642136,[retrie.*

(Continued)

*Primary Examiner* — Alpus H Hsu
*Assistant Examiner* — Dharmesh Patel
(74) *Attorney, Agent, or Firm* — Mahamedi Paradice LLP (57) ABSTRACT

A system and method are disclosed for performing ranging operations (700) between two or more wireless devices (STA1 and STA2). For some embodiments, the ranging operation allows each of a pair of ranging devices to estimate timing errors associated with measuring the time of arrival (TOA) of received signals, and to remove such timing errors from the measured TOA values. TOA and time of departure (TOD) information may also be exchanged between the devices using measurement action frames defined by IEEE 802.11v standards. In addition, an iterative process (800) is disclosed that allows a sequence of measurement action frames exchanged between the ranging devices to refine the timing errors and thus also refine the round trip time (RTT) value of signals exchanged between the devices.

21 Claims, 8 Drawing Sheets

(56) References Cited

U.S. PATENT DOCUMENTS

| | | | |
|---|---|---|---|
| 8,335,173 B2 * | 12/2012 | Hart et al. | 370/310 |
| 8,441,943 B2 * | 5/2013 | Kyusojin et al. | 370/248 |
| 2002/0155845 A1 * | 10/2002 | Martorana | 455/456 |
| 2007/0184864 A1 | 8/2007 | Leitch et al. | |
| 2011/0250844 A1 | 10/2011 | Gorday | |
| 2011/0269478 A1 | 11/2011 | Das et al. | |
| 2012/0163261 A1 * | 6/2012 | Vedantham et al. | 370/311 |
| 2012/0229334 A1 * | 9/2012 | Waters et al. | 342/357.42 |

OTHER PUBLICATIONS

International Search Report and Written Opinion—PCT/US2013/043187—ISA/EPO—Sep. 23, 2013.

Proposed 802.11v "Timing Measurement" changes and implications to 802.1AS Kevin Stanton Intel Corporation May 13, 2008; as-stanton-overview-of-wireless-las-for-80 21-eilat-05-08, IEEE Draft; As-Stanton-Overview-of-Wireless-1AS-For-80 21-Eilat-05-08, IEEE-SA, Piscataway, NJ USA, vol. 802.1, May 13, 2008, pp. 1-12, XP017642136, [retrieved on May 13, 2008].

* cited by examiner

RTT BASED RANGING SYSTEM AND METHOD

TECHNICAL FIELD

The present embodiments relate generally to wireless networks, and specifically to ranging operations performed between Wi-Fi enabled devices.

BACKGROUND OF RELATED ART

The recent proliferation of Wi-Fi access points in wireless local area networks (WLANs) has made it possible for navigation systems to use these access points for position determination, especially in areas where there are a large concentration of active Wi-Fi access points (e.g., urban cores, shopping centers, office buildings, and so on). For example, a client device or station (STA) such as a cell phone or tablet computer can use the round trip time (RTT) of signals transmitted to and from the access points (APs) to calculate the distances between the STA and the APs. Once the distances between the STA and three APs are calculated, the location of the STA can be estimated using trilateration techniques. The distances between APs can also be calculated using the RTT of signals transmitted between the APs, and thereafter trilateration techniques may be used to determine and/or verify the locations of the APs. Similarly, the distance between a pair of STAs can also be calculated using the RTT of signals transmitted between the STAs, and thereafter trilateration techniques may be used to determine and/or verify the locations of the STAs.

Figure 1:
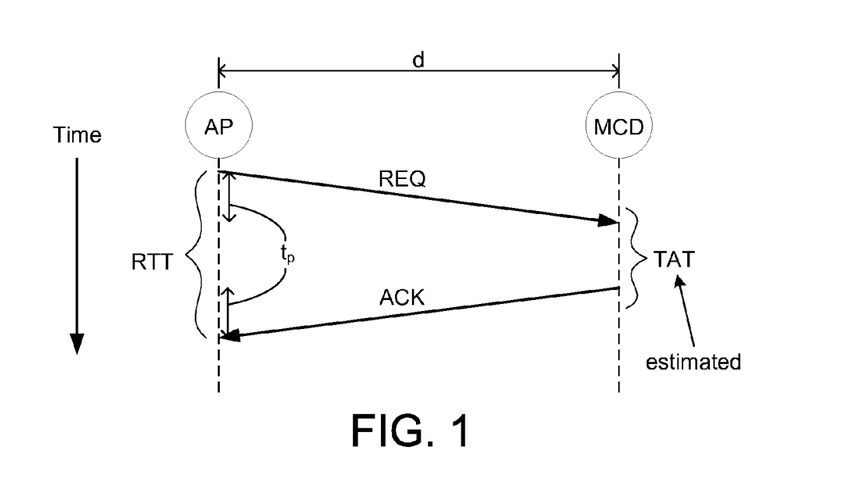
FIG. 1 is a sequence diagram depicting a conventional RTT ranging operation.

For example, referring to FIG. 1, the distance (d) between an access point (AP) and a mobile communication device (MCD) can be calculated as $d=c \cdot t_p/2=c \cdot (RTT-TAT)/2$, where c is the speed of light, $t_p$ is the summation of the actual signal propagation times of request (REQ) and acknowledgement (ACK) signals exchanged between AP and MCD, and TAT is the turn-around time (or processing delay) corresponding to the time delay between MCD receiving REQ from AP and beginning its transmission of ACK to back AP. Typically, the value of RTT is measured by AP as the difference between the time of departure (TOD) of REQ from AP and the time of arrival (TOA) of ACK at AP, and the value of TAT is estimated by AP.

Unfortunately, different make-and-models (and sometimes even same make-and-models) of mobile communication devices (as well as wireless access points) have different processing delays, and therefore it is difficult for AP to accurately estimate the correct TAT for MCD. Further complicating matters, the TAT for MCD may vary between packet transmissions (e.g., the TAT of MCD may not be constant over a given period of time). Thus, because of the large value of c with respect to d, errors in the calculated value of RTT resulting from slight errors in the estimated value of the TAT of MCD can lead to large errors in the calculated distance d between AP and MCD. In addition, when AP receives the ACK from MCD, the measured TOA value may be different from the actual TOA because of multipath effects, internal timing errors, and/or measuring errors, which can also lead to errors in the calculated distance d between AP and MCD.

Thus, there is a need to increase the accuracy of RTT ranging operations performed between two wireless communication devices.

SUMMARY

A system and method are disclosed for improving the accuracy of ranging operations performed between devices capable of wireless communications. More specifically, in accordance with some embodiments, first and second Wi-Fi enabled stations (STA1 and STA2) exchange request (REQ) and acknowledgement (ACK) frames to calculate an RTT value between STA1 and STA2. STA2 estimates the timing error associated with its measured TOA of the REQ frame, calculates a corrected TOA value for the REQ frame, and sends the corrected TOA of the REQ frame and the TOD of the ACK frame back to STA1 using a measurement action frame defined by the IEEE 802.11v synchronization protocols. In response thereto, STA1 can calculate the turn-around time (TAT) of STA2 using actual TOD and TOA values measured by STA2, rather than using a predetermined estimate of the TAT of STA2. In this manner, the TAT of STA2 can be calculated in a manner that compensates for variations in the TAT of STA2, and can therefore be used to calculate a more accurate RTT value between STA1 and STA2 (e.g., compared with conventional techniques that do not estimate TOA timing errors and/or that do not provide STA1 with the actual TAT of STA2).

In addition, for some embodiments, STA2 and STA1 can exchange a sequence of N≥2 measurement action frames and measurement acknowledgement frames using the IEEE 802.11v synchronization protocols to iteratively correct the TOA values measured by STA1 and/or STA2 so that the estimated TOA values converge to the actual TOA values. More specifically, each exchange of measurement frames generates a pair of half RTT values, whereby each half RTT value indicates the propagation time of a corresponding signal transmitted from one of STA1/STA2 to the other of STA1/STA2. For some embodiments, each measurement action frame sent from STA2 to STA1 includes TOD and TOA information calculated by STA2 for the previous measurement frame exchange. Then, after N pairs of measurement frames have been exchanged between STA2 and STA1, STA1 can calculate a refined RTT value between STA1 and STA2 by averaging the number N−1 of half RTT values as $$RTT_{refined} = \frac{1}{2N-2} \sum_{i=3}^{2N} (t_{2i}^{corr} - t_{2i-1}).$$

Further, STA2 can use each measurement action frame to inform STA1 of the TOD value of the previously sent measurement action frame and the corrected TOA value of the previously received measurement acknowledgement frame. Thus, by using the IEEE 802.11v measurement frames, STA2 can sequentially inform STA1 of its previous TOD/TOA measurements without initiating a number of separate and sequential RTT ranging operations, thereby allowing STA1 to refine the RTT value between STA1 and STA2 using a plurality of sequentially exchanged measurement frames while remaining on the same channel. As a result, the present embodiments can improve the accuracy of ranging operations performed between Wi-Fi enabled devices.

BRIEF DESCRIPTION OF THE DRAWINGS

The present embodiments are illustrated by way of example and are not intended to be limited by the figures of the accompanying drawings. Like numbers reference like elements throughout the drawings and specification.

DETAILED DESCRIPTION

The present embodiments are described below in the context of ranging operations performed by and between Wi-Fi enabled mobile stations (STA) for simplicity only. It is to be understood that the present embodiments are equally applicable for performing ranging operations using signals of other various wireless standards or protocols, and for performing ranging operations between other devices (e.g., between a STA and a wireless AP, between APs, and so on). As used herein, the terms WLAN and Wi-Fi can include communications governed by the IEEE 802.11 standards, Bluetooth, HiperLAN (a set of wireless standards, comparable to the IEEE 802.11 standards, used primarily in Europe), and other technologies having relatively short radio propagation range.

In the following description, numerous specific details are set forth such as examples of specific components, circuits, and processes to provide a thorough understanding of the present disclosure. Also, in the following description and for purposes of explanation, specific nomenclature is set forth to provide a thorough understanding of the present embodiments. However, it will be apparent to one skilled in the art that these specific details may not be required to practice the present embodiments. In other instances, well-known circuits and devices are shown in block diagram form to avoid obscuring the present disclosure. The term "coupled" as used herein means connected directly to or connected through one or more intervening components or circuits. Any of the signals provided over various buses described herein may be time-multiplexed with other signals and provided over one or more common buses. Additionally, the interconnection between circuit elements or software blocks may be shown as buses or as single signal lines. Each of the buses may alternatively be a single signal line, and each of the single signal lines may alternatively be buses, and a single line or bus might represent any one or more of a myriad of physical or logical mechanisms for communication between components. The present embodiments are not to be construed as limited to specific examples described herein but rather to include within their scopes all embodiments defined by the appended claims.

Figure 2:
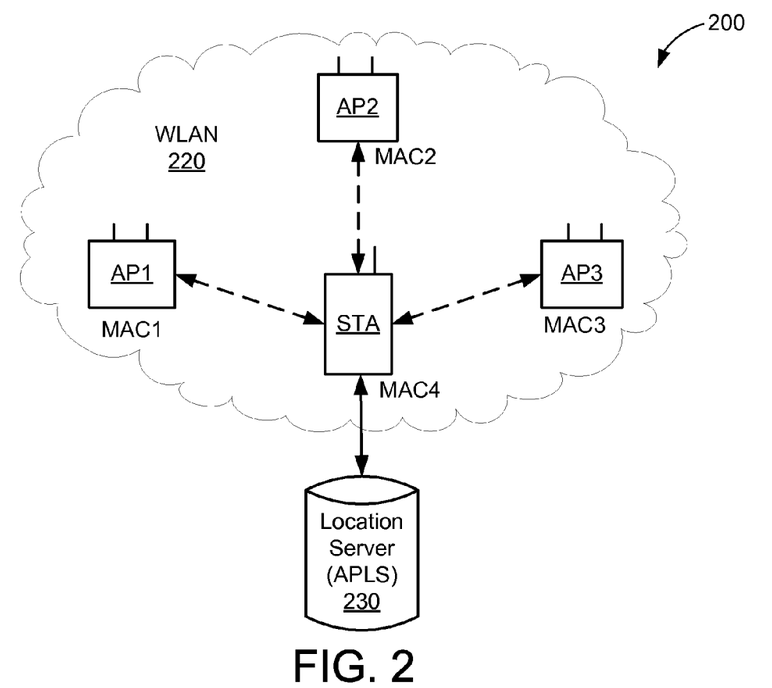
FIG. 2 is a block diagram of a WLAN positioning system within which the present embodiments can be implemented.

FIG. 2 is a block diagram of a wireless positioning system 200 within which the present embodiments can be implemented. System 200 is shown to include a mobile station (STA), a wireless local area network (WLAN) 220, and an access point location server (APLS) 230. The WLAN 220 is formed by a plurality of Wi-Fi access points (APs) that may operate according to the IEEE 802.11 family of standards (or according to other suitable wireless protocols). Although only three access points AP1-AP3 are shown in FIG. 1 for simplicity, it is to be understood that WLAN 220 can be formed by any number of access points. Each of access points AP1-AP3 is assigned a unique MAC address (i.e., MAC1-MAC3, respectively) that is programmed therein by, for example, the manufacturer of the access point. Similarly, the STA is assigned a unique MAC address (i.e., MAC4) that is programmed therein by, for example, the manufacturer of the STA. Each MAC address, which may be commonly referred to as the "burned-in address," the organizationally unique identifier (OUI), or the BSSID, in one embodiment includes six bytes (and thus 12 nibbles) of data. The first 3 bytes of the MAC address may identify which organization manufactured the access point device, and may be assigned to such organizations by the Institute of Electrical and Electronic Engineers (IEEE). The second 3 bytes of the MAC address, which may be referred to as the network interface controller (NIC) specific bytes, may be used to uniquely identify the individual access point device.

The APLS 230, which stores the MAC addresses and location coordinates of a plurality of deployed access points (e.g., not just access points AP1-AP3 of FIG. 1), provides an online database accessible by the STA that may be provided by companies such as Google, Skyhook, Devicescape, and/or WiGLE. The APLS 230 may also store other information associated with the access points including, for example, the accuracy of the location coordinates of each access point, the last location update for each access point, the last time each access point was visible, the protocol version of each access point, and so on. For some embodiments, selected portions of the data stored in APLS 230 can be retrieved and stored within the STA, as described in more detail below.

For some embodiments, ranging operations described herein can be performed without using the WLAN 220, for example, by having a number of STA devices operating in an ad-hoc or peer-to-peer mode, thereby allowing the STA devices to range one another even when outside the reception range of a visible WLAN or other wireless network. For such embodiments, a first STA can seek out and communicate with a second STA using probe signals embedded with its identification information (e.g., the MAC address of the first STA), and the second STA can respond with a probe response or NULL frame that includes its identification information (e.g., the MAC address of the second STA). Once identification and channel information have been exchanged, the first and second STA devices can establish a direct "peer-to-peer" connection and exchange REQ, ACK, and measurement action frames to perform ranging operations in accordance with the present embodiments, as described in more detail below.

The STA, which may also be referred to herein as a mobile device, can be any suitable Wi-Fi enabled device including, for example, a cell phone, PDA, tablet computer, laptop computer, wireless access point, or the like. For the exemplary embodiments described herein, the STA includes radio frequency (RF) ranging circuitry (e.g., formed using well-known software modules, hardware components, and/or a suitable combination thereof) that can be used to estimate the distance between itself and one or more other Wi-Fi enabled devices using ranging techniques described herein. In addition, the STA includes a local memory (not shown in FIG. 2 for simplicity) that can store a cache of Wi-Fi access point location data, and includes a processor (not shown in FIG. 2 for simplicity) that can execute WLAN positioning software, ranging software, measurement action frame embedding software, TOA correction software, and other software modules (e.g., data retrieval software for retrieving AP information from the APLS 230), as explained in more detail below.

Figure 3:
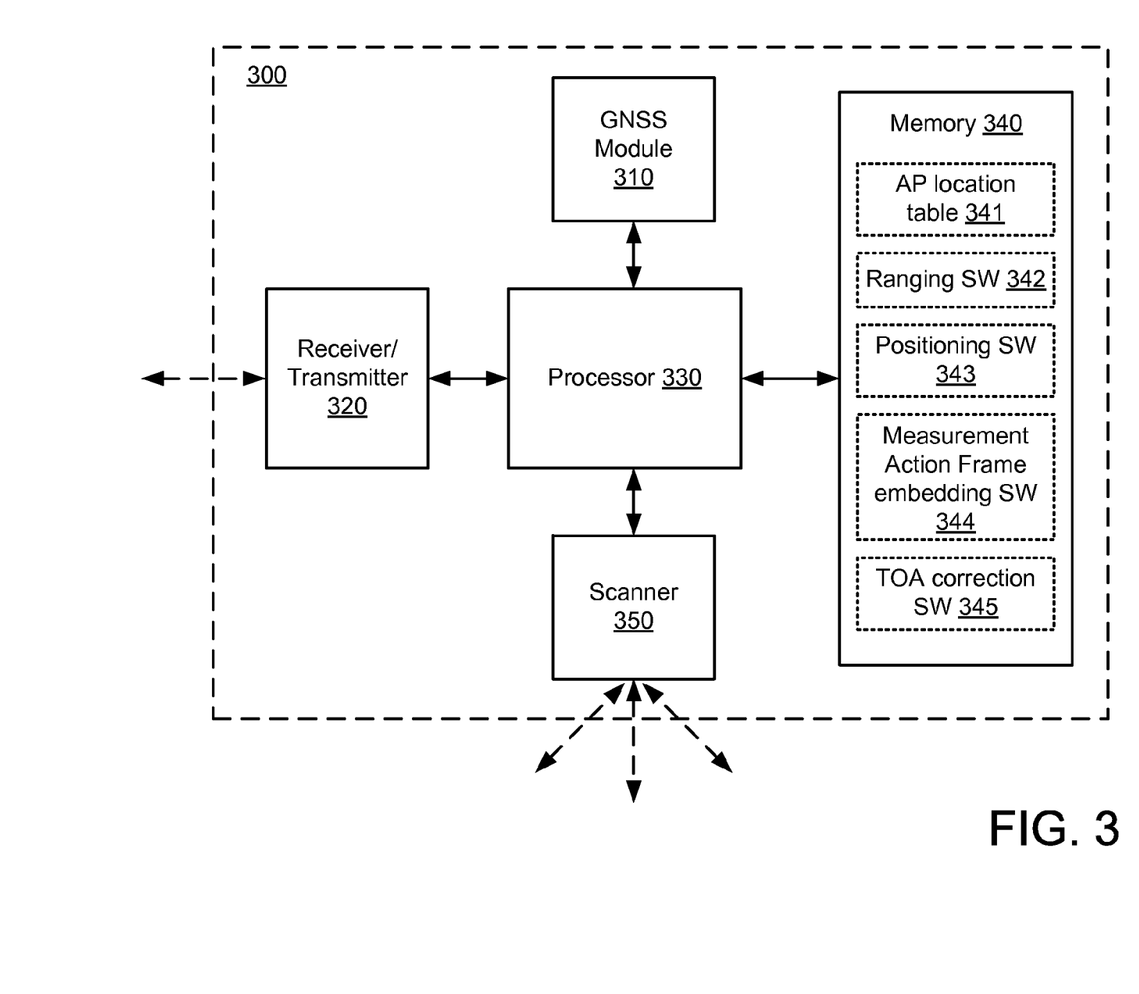
FIG. 3 is a block diagram of a mobile station (STA) in accordance with some embodiments.

FIG. 3 shows a STA 300 that is one embodiment of the STA device of FIG. 2. The STA 300 includes a global navigation satellite system (GNSS) module 310, a transmitter/receiver circuit 320, a processor 330, a memory 340, and a scanner 350. The receiver/transmitter circuit 320 can be used to transmit signals to and receive signals from access points AP1-AP3, other STA devices, and/or APLS 230 (see also FIG. 2). Scanner 350, which is well-known, can be used to scan the surrounding environment to detect and identify nearby APs and/or other STA devices. For some embodiments, the scanner 350 can search for nearby APs and/or other STA devices by periodically transmitting MAC address request frames. An AP and/or other STA device within range of STA 300 receives one or more of the requests and responds by transmitting its MAC address to STA 300. If STA 300 has line-of-sight with a suitable number (e.g., 3 or more) navigation satellites, the GNSS module 310 can determine the current location of STA 300 using triangulation techniques, and can then provide the location information to processor 330 for storage in memory 340.

Figure 5A:
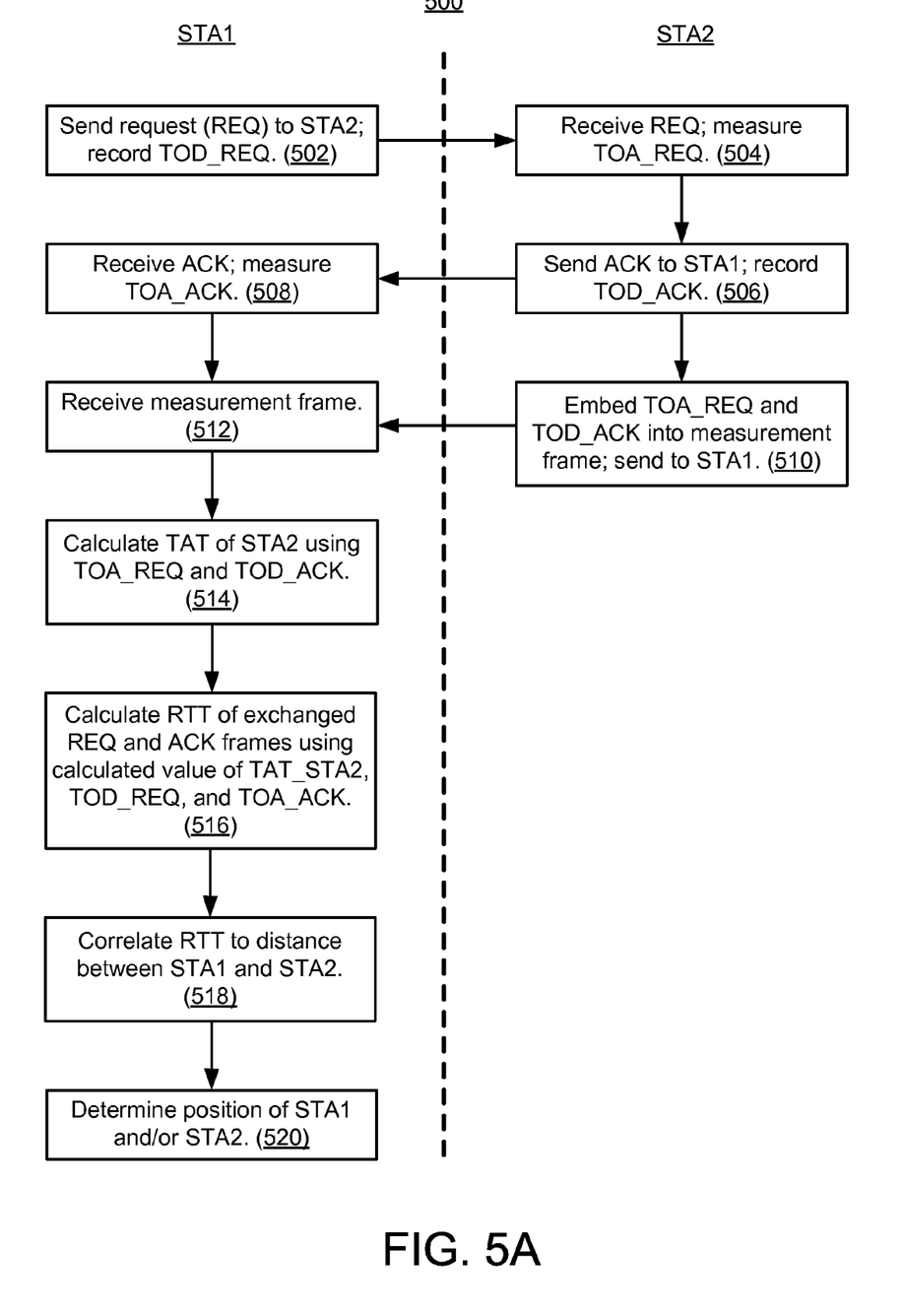
FIGS. 5A-5B show illustrative flowcharts depicting ranging operations performed by the two stations of the sequence diagram of FIG. 4 in accordance with the present embodiments.
Figure 5B:
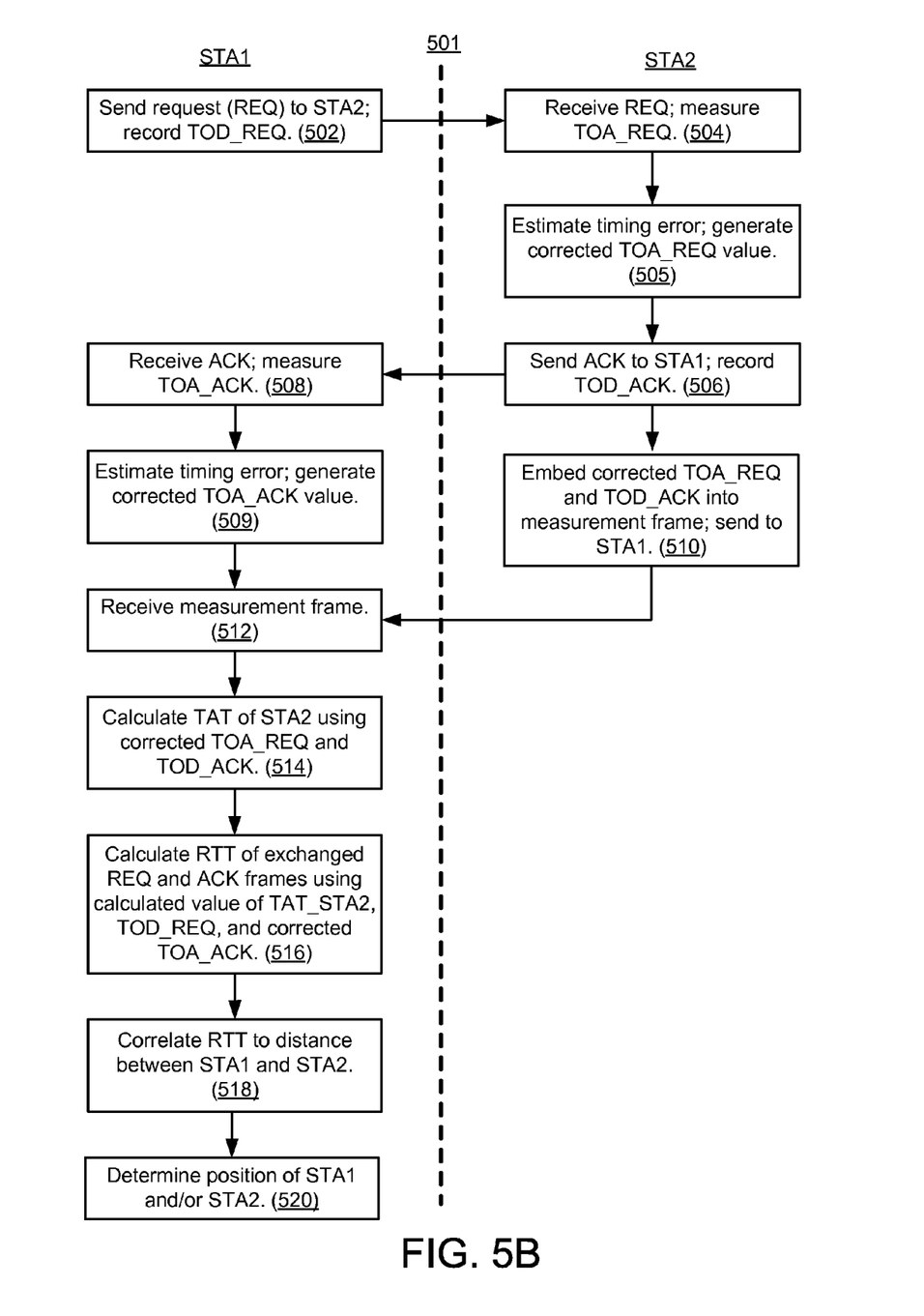
Figure 7:
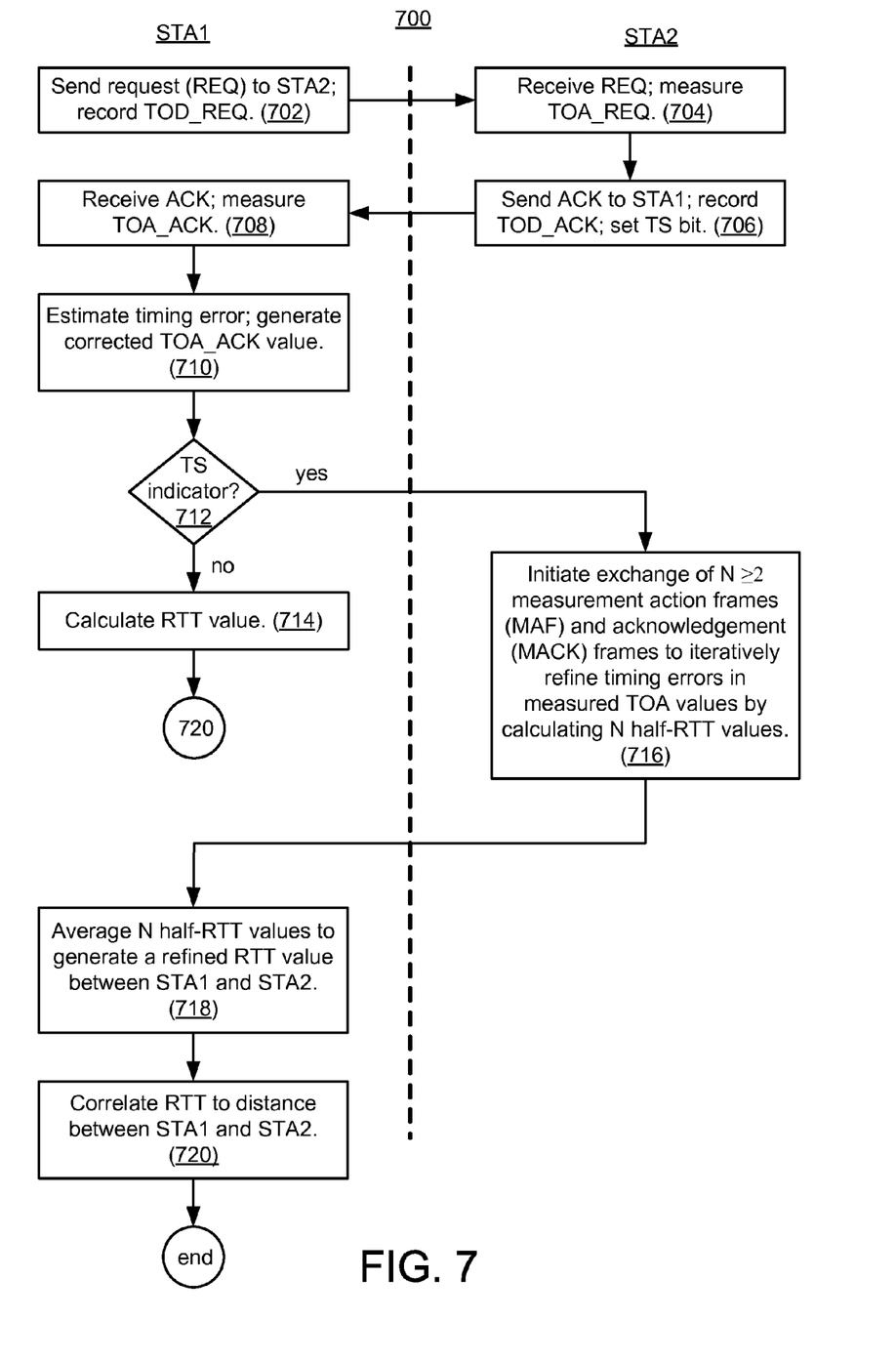
FIG. 7 shows an illustrative flowchart depicting the ranging operation performed by the two stations of the sequence diagram of FIG. 6 in accordance with the present embodiments.
Figure 8:
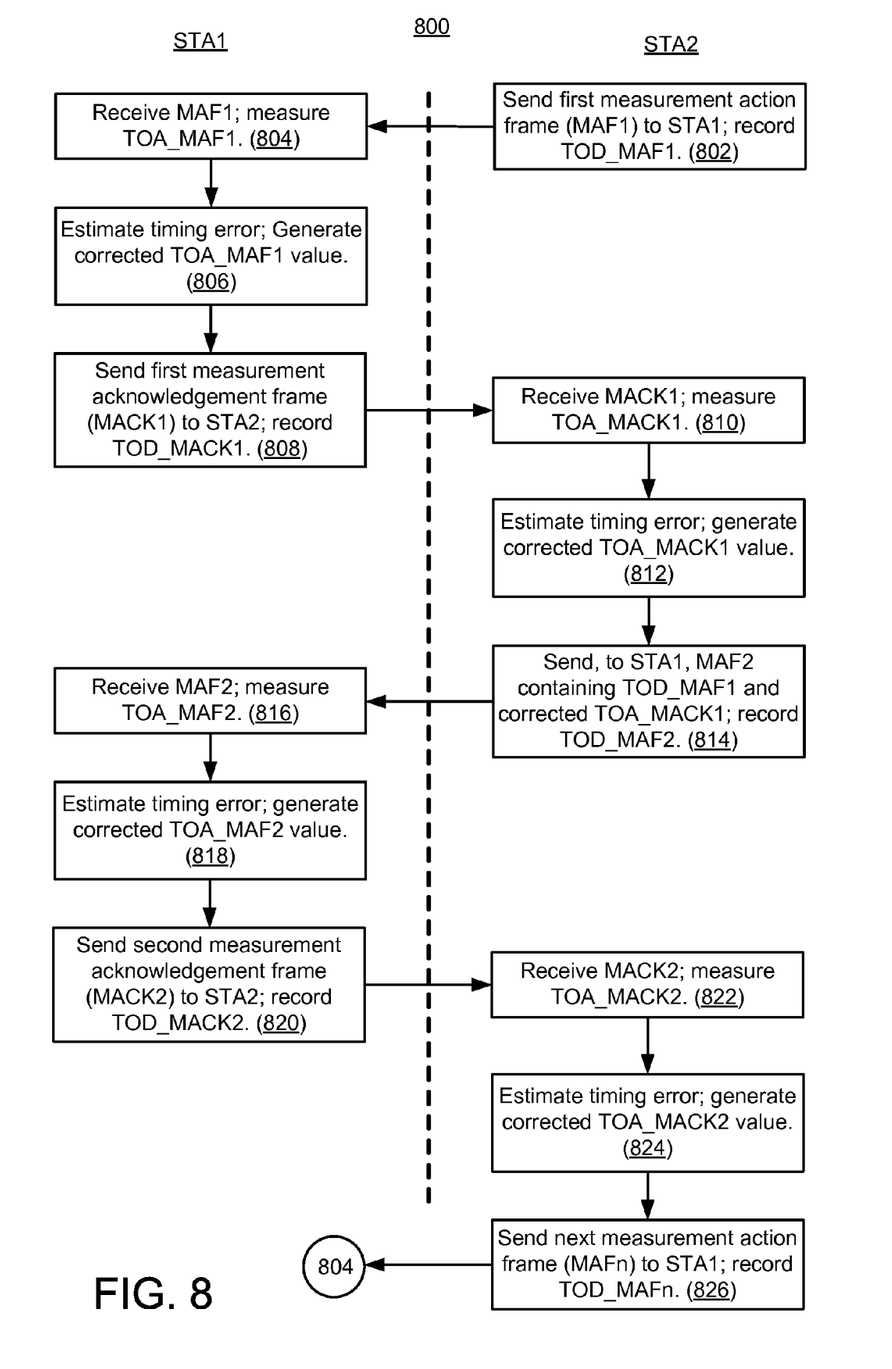
FIG. 8 shows an illustrative flowchart depicting the sequential exchange of measurement action frames and corresponding measurement acknowledgment frames between the two stations of the sequence diagram of FIG. 6 in accordance with the present embodiments.

Memory 340 includes an access point location table 341 that can be used as a local cache to store the MAC addresses of a plurality of access points, the location coordinates of such access points, and other suitable location or configuration information of the access points. Memory 340 also includes a non-transitory computer-readable medium (e.g., one or more nonvolatile memory elements, such as EPROM, EEPROM, Flash memory, a hard drive, and so on) that stores the following software modules:

- a ranging module 342 to calculate the distance between the STA 300 and a selected AP and/or another STA device (e.g., as described for operations 502, 504, 506, 508, 512, 514, 516 and 518 of FIGS. 5A-5B, for operations 702, 704, 706, 708, 712, and 718 of FIG. 7, and for a number of operations 802, 804, 808, 810, 814, 816, 820, 822, and 826 of FIG. 8);
- a positioning module 343 to determine the location of the STA based on the distances calculated by the ranging module 342 and the locations of the selected APs and/or other STA devices using trilateration techniques (e.g., as described for operation 520 of FIGS. 5A-5B and for operation 720 of FIG. 7);
- a measurement action (MA) frame embedding module 344 to embed measured TOA and TOD information for the STA into measurement action frames, which in turn can be sent to another Wi-Fi enabled device according to the Wi-Fi timing synchronization protocols defined by the IEEE 802.11v family of standards (e.g., as described for operation 510 of FIGS. 5A-5B, for operation 716 of FIG. 7, and for operations 802, 804, 808, 810, 814, 816, 820, 822, and 826 of FIG. 8); and
- TOA correction module 345 to adjust TOA values measured by the STA to compensate for multipath errors, internal timing errors, and the like (e.g., as described for operations 505 and 509 of FIG. 5B, for operation 710 of FIG. 7, and for operations 806, 812, 818, and 824 of FIG. 8).

Each software module includes instructions that, when executed by processor 330, cause the STA 300 to perform the corresponding functions. The non-transitory computer-readable medium of memory 340 thus includes instructions for performing all or a portion of the operations of method 500 of FIG. 5, method 501 of FIG. 5B, method 700 of FIG. 7, and/or method 800 of FIG. 8.

Processor 330, which is coupled to receiver/transmitter 320, GNSS module 310, memory 340, and scanner 350, can be any suitable processor capable of executing scripts or instructions of one or more software programs stored in STA 300 (e.g., within memory 340). For example, processor 330 can execute ranging module 342, WLAN positioning module 343, measurement action frame embedding module 344, and TOA correction module 345. The ranging module 342 can be executed by processor 330 to determine the distance between the STA 300 and another Wi-Fi enabled device using RF ranging operations. The positioning module 343 can be executed by processor 330 to determine the location of STA 300 using nearby APs and/or other STA devices as reference points. For example, to determine the position of STA 300, the precise locations of three selected APs and/or other STA devices having known locations are first determined. For some embodiments, the locations of the selected APs can be obtained either by accessing their location coordinates from location table 341 or by retrieving their location coordinates from the APLS 230. Next, positioning module 343 as executed by processor 330 uses the location coordinates of the selected APs and/or other STA devices and the estimated distances between them and STA 300 to calculate the position of STA 300 using trilateration techniques. The measurement action frame (MAF) embedding module 344 can be executed by processor 330 to embed REQ TOA and ACK TOD information for the STA into measurement action frames, which in turn can be sent to another Wi-Fi enabled device (e.g., a selected AP and/or other STA device) according to the Wi-Fi synchronization protocols defined by the IEEE 802.11v family of standards. The TOA correction module 345 can be executed by processor 330 to adjust TOA values measured by the STA 300 to compensate for multipath errors, internal timing errors, and the like.

Figure 4:
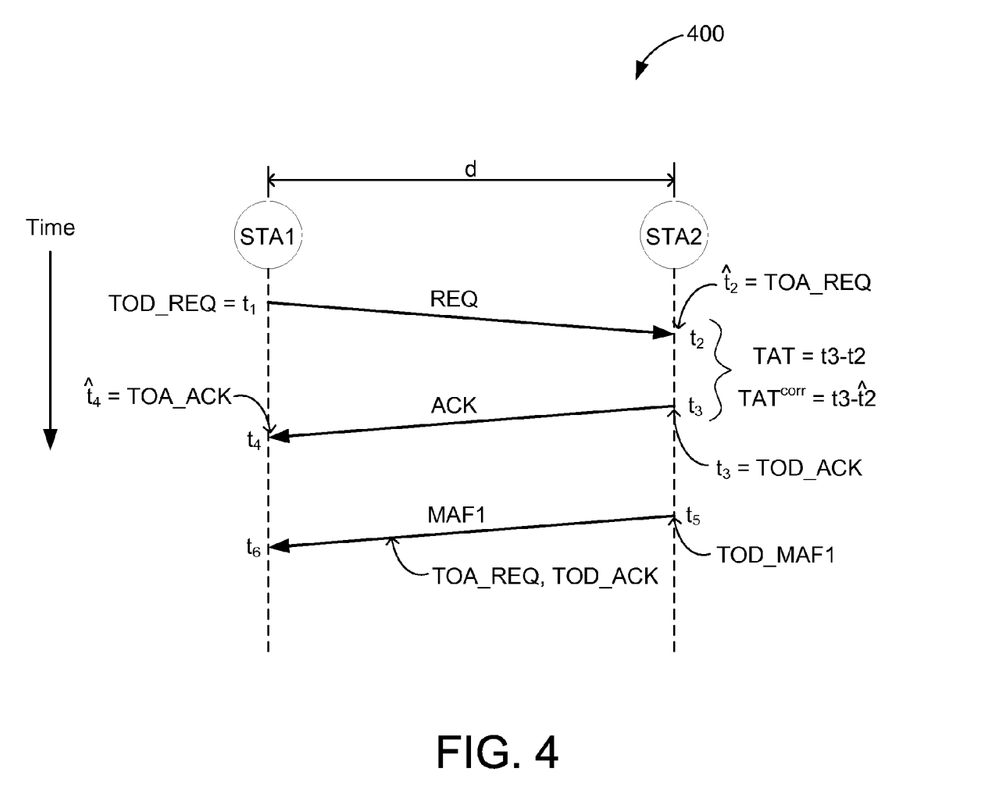
FIG. 4 is a sequence diagram depicting a simplified RTT ranging operation in accordance with some embodiments.

FIG. 4 depicts an exemplary ranging operation 400 performed by first and second devices STA1 and STA2 in accordance with some embodiments, for example, to determine a distance (d) between STA1 and STA2. For purposes of discussion herein, STA1 and STA2 are embodiments of STA 300 of FIG. 3. However, STA1 and STA2 can be any suitable Wi-Fi enabled device including, for example, a mobile device (e.g., a smart phone or tablet computer) or a stationary device (e.g., a wireless access point or other ranging device).

Referring also to the illustrative flow chart 500 of FIG. 5A, the ranging operation depicted in FIG. 4 begins with STA1 sending a request (REQ) frame to STA2 at time $t_1$, and then recording the time of departure of the REQ frame as $t_1$=TOD_REQ (502). STA2 receives the REQ frame at time $t_2$, and measures the time of arrival of the REQ frame at STA2 as $\hat{t}_2$=TOA_REQ (504). Note that although the actual TOA of the REQ frame at STA2 is denoted as $t_2$, the TOA_REQ measured by STA2 is denoted as $\hat{t}_2$, where the measured TOA value $\hat{t}_2$ may differ from the actual TOA value $t_2$ because of multipath effects and/or internal timing errors. Thus, the difference between the actual TOA and the measured TOA for the REQ frame at STA2 is denoted herein as:

$$\Delta t_2 = \hat{t}_2 - t_2.$$

STA2 responds to the received REQ frame by sending an acknowledgement (ACK) frame back to STA1 at time $t_3$, and then STA2 records the time of departure of the ACK frame as $t_3$=TOD_ACK (506). STA1 receives the ACK frame at time $t_4$, and measures the time of arrival of the ACK frame at STA1 as $\hat{t}_4$=TOA_ACK (508). Note that although the actual TOA of the ACK frame at STA1 is denoted as $t_4$, the TOA_ACK measured by STA1 is denoted as $\hat{t}_4$, where the measured TOA value $\hat{t}_4$ may differ from the actual TOA value $t_4$ because of multipath effects and/or internal timing errors. Thus, the difference between the actual TOA and the measured TOA for the ACK frame at STA1 is denoted herein as: $\Delta t_4 = \hat{t}_4 - t_4$. Accordingly, as used herein, times or timestamps denoted as $t_x$ indicate an actual TOA (or actual TOD), while times or timestamps denoted as $\hat{t}_x$ indicate the measured TOA, which as described above may be different from the actual TOA because of multipath effects, internal timing errors, and so on.

In accordance with the present embodiments, STA2 can embed its values generated for TOA_REQ and TOD_ACK into a first measurement action frame (MAF1), and can then send the measurement action frame embedded with the TOA_REQ and TOD_ACK information to STA1 according to the Wi-Fi timing synchronization protocols defined in the IEEE 802.11v family of standards (510). More specifically, STA2 can embed the TOA_REQ and TOD_ACK values into the TOA and TOD fields of the measurement action frame, and can transmit the measurement action frame to STA1 according to IEEE 802.11v protocols. For example, Table 1 below depicts the fields of an IEEE 802.11v timing measurement action frame.

TABLE 1

| Category | Action | Dialog | Follow-Up | TOD | TOA | Max TOD error | MAX TOA error |
|---|---|---|---|---|---|---|---|

Thus, although the IEEE 802.11v standards were developed for transmitting TOD and TOA information for timing synchronization purposes (e.g., to synchronize the clocks of STA1 and STA2), the present embodiments can leverage the IEEE 802.11v-defined measurement action frames to provide STA1 with TOA and TOD values measured by STA2, which in turn allows STA1 to accurately calculate the TAT of STA2 using TOA and TOD information provided by STA2. This is in contrast to prior ranging solutions in which STA1 uses an estimated value of the TAT of STA2 when calculating the RTT value of REQ and ACK frames exchanged between STA1 and STA2.

Referring again to FIG. 5A, STA1 then receives the first measurement action frame (MAF1) from STA2 (512), and uses the embedded values of TOA_REQ and TOD_ACK to calculate the TAT of STA2 (514). For some embodiments, STA1 calculates the TAT of STA2 as TAT_STA2 = $t_3 - \hat{t}_2$. Because STA1 calculates the TAT of STA2 using values of TOA_REQ and TOD_ACK provided by STA2 (rather than using static, estimated TAT values), the value of TAT_STA2 calculated by STA1 in accordance with the present embodiments is more accurate than conventional techniques that do not provide TOA and/or TOD information from STA2 directly to STA1. Indeed, even if TAT_STA2 were to vary over time, the value of TAT_STA2 (calculated by STA1) remains accurate because STA2 provides TOA and TOD values to STA1 in the 802.11v-compliant measurement action frames.

Then, STA1 calculates a round trip time (RTT) value of the REQ and ACK frames exchanged between STA1 and STA2 using TOD_REQ, TOA_ACK, and the calculated value of TAT for STA2 (516). For some embodiments, STA1 alculates RTT = $(\hat{t}_4 - t_1 - TAT)$. Thereafter, STA1 can correlate the RTT value to the distance d between STA1 and STA2 (518). For some embodiments, STA1 calculates d = (RTT−TAT)*c/2. Thereafter, the distances between each STA and 3 or more other STAs or APs can be used to determine the location of the STA (520).

As mentioned above, for some embodiments, STA2 and/or STA1 can utilize timing error algorithms (e.g., performed by TOA correction module 345 of FIG. 3) to estimate timing errors associated with the measured TOA values $\hat{t}_2$=TOA_REQ at STA2 and $\hat{t}_4$=TOA_ACK at STA1, respectively, and thereafter correct the measured TOA values. For example, FIG. 5B shows a flow chart 501 depicting another exemplary ranging operation between STA1 and STA2 in which STA1 generates a corrected value for TOA_ACK, STA2 generates a corrected value for TOA_REQ, and then STA1 calculates corrected TAT of_STA2 and RTT values using the corrected TOA_REQ and TOA_ACK values. The flow chart 501 contains all of the steps of flow chart 500 of FIG. 5A, with the addition of TOA correction steps 505 and 509 and the modification of steps 514 and 516 to use the corrected TOA values. More specifically, after STA2 measures $\hat{t}_2$=TOA_REQ (504), STA2 estimates the timing error in TOA_REQ as $\Delta t_2 = \hat{t}_2 - t_2$, and generates a corrected TOA_REQ value as $t_2^{corr} = \hat{t}_2 - \Delta t_2$ (505). STA2 sends the ACK frame back to STA1 at time $t_3$, and records the time of departure of the ACK frame as $t_3$=TOD_ACK (506). Then, in accordance with the present embodiments, STA2 sends the recorded TOD_ACK value and the corrected TOA_REQ value to STA1 using the first measurement action frame (MAF1) according to the IEEE 802.11v timing synchronization protocols (510).

STA1 receives the ACK frame from STA2, and measures the TOA of the ACK frame at STA1 as $\hat{t}_4$=TOA_ACK (508). Then, STA1 estimates the timing error in TOA_ACK as $\Delta t_4 = \hat{t}_4 - t_4$, and generates a corrected TOA_ACK value as $t_4^{corr} = \hat{t}_4 - \Delta t_4$ (509). Note that, in accordance with the present embodiments, STA1 and STA2 can estimate the timing errors and then generate corrected TOA values in a single exchange of REQ/ACK frames while remaining on the same channel, thereby alleviating the need to use multiple channels to generate multiple sequence measurements for each value of TOA to be corrected. This advantageously avoids the need to use multiple channels, antennas, and/or frame exchanges to generate corrected TOA values.

After STA1 receives the measurement action frame containing the TOD_ACK and the corrected TOA_REQ value (512), STA1 can calculate a corrected value for TAT of STA2 as $TAT^{corr} = t_3 - t_2^{corr} = t_3 - (\hat{t}_2 - \Delta t_2)$ (514). Thereafter, STA1 can calculate a corrected value for RTT as $RTT^{corr} = t_4^{corr} - t_1 - TAT^{corr} = (\hat{t}_4 - \Delta t_4) - t_1 - TAT^{corr}$ (516). Thereafter, STA1 can correlate the corrected RTT value to the distance d between STA1 and STA2 (518). For some embodiments, STA1 calculates d = $(RTT^{corr} - TAT^{corr})$*c/2. Thereafter, the distances between each STA and 3 or more other STAs or APs can be used to determine the location of the STA (520).

Figure 6:
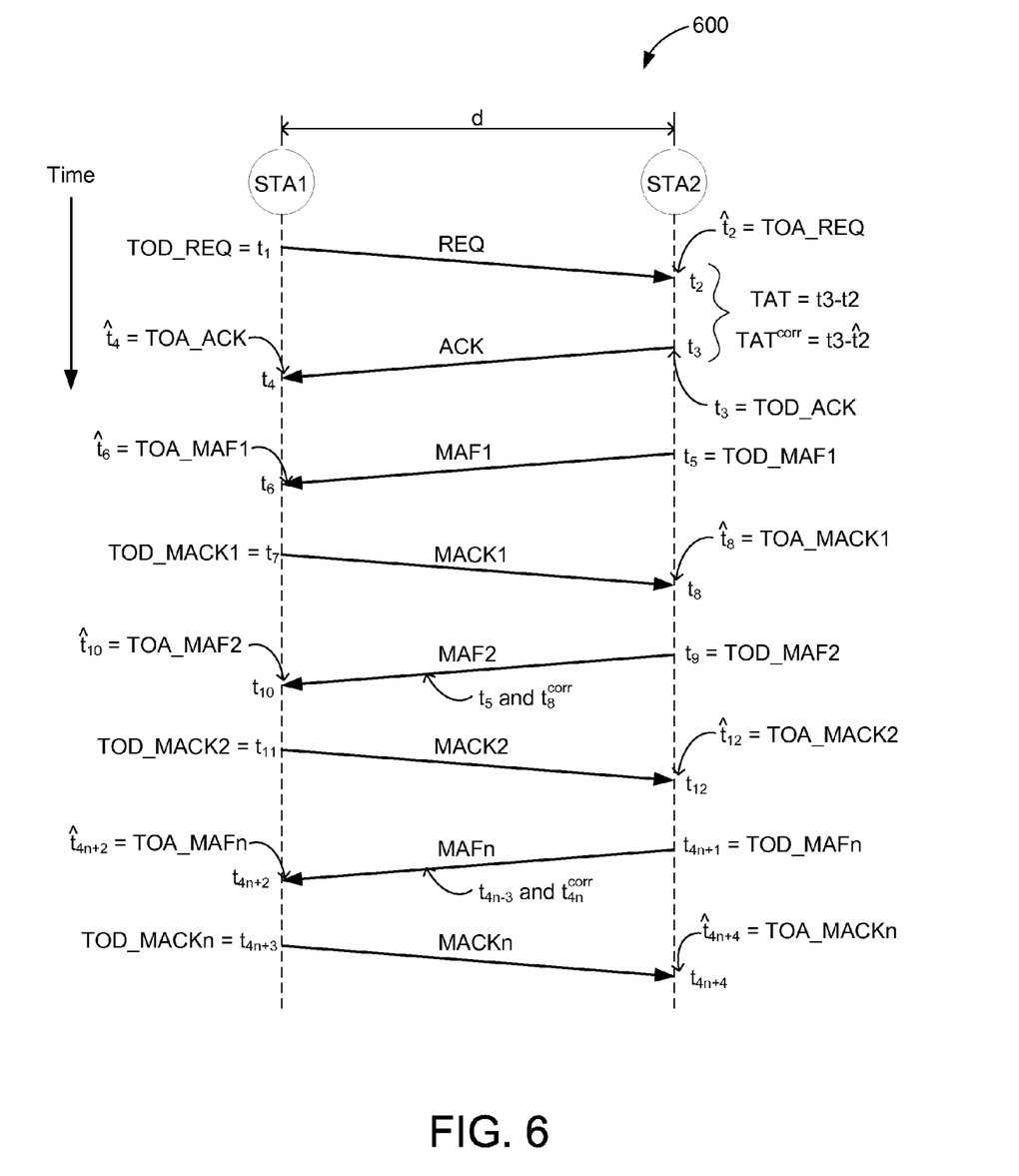
FIG. 6 is a sequence diagram depicting a more detailed RTT ranging operation in accordance with other embodiments.

FIG. 6 depicts a more detailed exemplary ranging operation 600 performed by first and second devices STA1 and STA2 that, in accordance with other embodiments, allows the corrected TOA values to be iteratively refined using a sequence of measurement action frames and measurement acknowledgement frames exchanged between STA1 and STA2 using the IEEE 802.11v synchronization protocols. For purposes of discussion herein, STA1 and STA2 are embodiments of STA 300 of FIG. 3. However, as mentioned above, STA1 and STA2 can be any suitable Wi-Fi enabled device including, for example, a mobile device (e.g., a smart phone or tablet computer) or a stationary device (e.g., a wireless access point or other ranging device).

Referring also to the illustrative flow chart 700 of FIG. 7, the ranging operation depicted in FIG. 6 begins with STA1 sending a request (REQ) frame to STA2 at time $t_1$, and then recording the time of departure of the REQ frame as $t_1$=TOD_REQ (702). STA2 receives the REQ frame at time $t_2$, and may also measure the time of arrival of the REQ frame at STA2 as $\hat{t}_2$=TOA_REQ (704). STA2 responds to the received REQ frame by sending an acknowledgement (ACK) frame back to STA1 at time $t_3$, where STA2 may also record the time of departure of the ACK frame as $t_3$=TOD_ACK and set a timestamp (TS) indicator bit within the ACK frame (706). In accordance with the present embodiments, STA2 sets the TS indicator bit provided within the ACK frame to a first state (e.g., an asserted state) if STA2 is able to capture timestamps, and sets the TS indicator bit to a second state (e.g., a de-asserted state) if STA2 is not able to capture timestamps.

STA1 receives the ACK frame at time $t_4$, and measures the time of arrival of the ACK frame at STA1 as $\hat{t}_4$=TOA_ACK (708). Then, STA1 estimates the timing error in TOA_ACK as $\Delta t_4 = \hat{t}_4 - t_4$, and generates a corrected TOA_ACK value as $t_4^{corr} = \hat{t}_4 - \Delta t_4$ (710). In this manner, STA1 removes the timing error from TOA_ACK.

Then, in accordance with the present embodiments, if STA1 determines that the TS indicator bit contained in the ACK frame indicates that STA2 is not able to capture timestamps, as tested at 712, then STA2 calculates the RTT value as RTT=$t_4^{corr} - t_1$ -TAT_STA2 (714). In this example, the value of TAT_STA2 can be estimated by STA1. Thereafter, the RTT value can be correlated to a distance between STA1 and STA2 (720).

Conversely, if STA1 determines that the TS indicator bit contained in the ACK frame indicates that STA2 can capture timestamps, as tested at 712, then STA2 initiates an exchange of a sequence of N≥2 measurement action frames (MAF) and corresponding measurement acknowledgement (MACK) frames during which the timing errors in the measured TOA values are iteratively refined to more correct values, whereby each exchange of MAF and MACK frames can be used to generate a pair of half RTT values (716). As used herein, each half RTT value indicates the propagation time of a corresponding signal (e.g., MAF or MACK signal) transmitted from one of STA1/STA2 to the other of STA1/STA2.

After N pairs of MAF and MACK frames are exchanged between STA2 and STA1 using the measurement action frames defined by the IEEE 802.11v family of standards, STA1 calculates a refined RTT value between STA1 and STA2 by averaging the number N−1 of half RTT values as $$RTT_{refined} = \frac{1}{2N-2} \sum_{i=3}^{2N} (t_{2i}^{corr} - t_{2i-1}). \quad (718)$$

Thereafter, STA1 can correlate the refined RTT value to a distance between STA1 and STA2 (720). Thus, in accordance with such embodiments, accuracy of the resultant RTT value (and thus the accuracy of the calculated distance between STA1 and STA2) increases as the number of sequential exchanges of MAF/MACK frames between STA1 and STA2 increases.

FIG. 8 is an illustrative flow chart 800 that depicts an exemplary operation of sequentially exchanging MAF/MACK frames between STA1 and STA2. Thus, the flow chart 800 depicted in FIG. 8 describes an exemplary embodiment for performing step 710 of flow chart 700 of FIG. 7. Note that all measurement action frames (MAFs) and measurement acknowledgement frames (MACKs) exchanged between STA1 and STA2 during the operation of method 800 are transmitted according to the IEEE 802.11v timing synchronization protocols.

Referring also to FIG. 6, STA2 sends a first measurement action frame (MAF1) to STA1 at time $t_5$, and records the TOD of MAF1 as $t_5$=TOD_MAF1 (802). STA1 receives MAF1 at time $t_6$, and measures the TOA of MAF1 as $\hat{t}_6$=TOA_MAF1 (804). STA1 then estimates the timing error in TOA_MAF1 as $\Delta t_6 = \hat{t}_6 - t_6$, and generates a corrected TOA_MAF1 as $t_6^{corr} = \hat{t}_6 - \Delta t_6$ (806). Next, STA1 sends a first measurement acknowledgement (MACK1) frame to STA2 at $t_7$, and records the TOD of MACK1 as $t_7$=TOD_MACK1 (808).

STA2 receives MACK1 at $t_8$, and measures the TOA of MACK1 as $\hat{t}=$TOA_MACK1 (810). STA2 estimates the timing error in TOA_MACK1 as $\Delta t_8 = \hat{t}_8 - t_8$, and generates a corrected TOA for MACK1 as $t_8^{corr} = \hat{t}_8 - \Delta t_8$ (812). Then, STA2 sends to STA1 a second measurement action frame (MAF2) that is embedded with $t_5$=TOD_MAF1 and $t_8^{corr}$ as the corrected TOA for MACK1, and records the TOD of MAF2 as $t_9$=TOD_MAF2 (814).

STA1 receives MAF2 at time $t_{10}$, and measures the TOA of MAF2 as $\hat{t}_{10}$=TOA_MAF2 (816). STA1 then estimates the timing error in TOA_MAF2 as $\Delta t_{10} = \hat{t}_{10} - t_{10}$, and generates a corrected TOA_MAF2 as $t_{10}^{corr} = \hat{t}_{10} - \Delta t_{10}$ to remove the timing error from TOA_MAF2 (818). Next, STA1 sends a second measurement acknowledgement (MACK2) frame to STA2 at $t_{11}$, and records the TOD of MACK1 as $t_{11}$=TOD_MACK1 (820).

STA2 receives MACK2 at $t_{12}$, and measures the TOA of MACK2 as $\hat{t}_{12}$=TOA_MACK2 (822). STA2 estimates the timing error in $\hat{t}_{12}$ as $\Delta t_{12} = \hat{t}_{12} - t_{12}$, and generates a corrected TOA for MACK2 as $t_{12}^{corr} = \hat{t}_{12} - \Delta t_{12}$ (824).

Thereafter, STA2 and STA1 continue exchanging MAF and MACK frames until a desired number N of such frame exchanges have occurred (826, 804). After the sequence of N measurement action frames and measurement acknowledgement frames are exchanged between STA1 and STA2, STA1 has the timing information of $t_5$, $t_6^{corr}$, $t_7$, $t_8^{corr}$, . . . , $t_{4n-3}$, $t_{4n-2}^{corr}$, $t_{4n-1}$, and $t_{4n}^{corr}$, and can use the following expression to calculate the refined RTT value between STA1 and STA2:

$$RTT_{refined} = \frac{1}{2N-2} \sum_{i=3}^{2N} (t_{2i}^{corr} - t_{2i-1}).$$

For such embodiments, note that each measurement action frame sent from STA2 to STA1 includes TOD and TOA information calculated by STA2 for the previous MAF/MACK frame exchange. Thus, by using the IEEE 802.11v measurement frames, STA2 can sequentially inform STA1 of its previous TOD/TOA measurements without initiating a number of separate and sequential RTT ranging operations, thereby allowing STA1 to refine the RTT value between STA1 and STA2 using a plurality measurement frames while remaining on the same channel.

Accordingly, the present embodiments can use the iterative exchange of IEEE 802.11v-compliant measurement frames to iteratively refine the TOA values measured by STA1 and STA2 so that the corrected TOA values converge to the actual TOA values (e.g., by using feedback information to adjust the estimated timing errors in the TOA values measured by STA1 and STA2).

For other embodiments, instead of recording the TOD and TOA timestamps, STA1 and STA2 can instead record the time difference between pairs of corresponding TOD and TOA values. For example, in such other embodiments, STA1 can record the difference value $RTT_1 = t_4^{corr} - t_1$ instead of $t_4^{corr}$ and $t_1$, can record the difference value $TAT_{STA1}=t_6^{corr}-t_7$ instead of $t_6^{corr}$, and can record the difference value $RTT_n=t_7, \ldots, t_{4n-2}^{corr}-t_{4n-1}$ instead of $t_{4n-2}^{corr}$ and $t_{4n-1}$. Similarly, STA2 can record the difference value $RTT_2=t_8^{corr}-t_5$ instead of $t_8^{corr}$ and $t_5$, can record $RTT_3=t_{12}^{corr}-t_9$ instead of $t_{12}^{corr}$ and $t_9, \ldots$, and can record the difference value $t_{4n}^{corr}-t_{4n-3}$ instead of $t_{4n}^{corr}$ and $t_{4n-3}$.

In the foregoing specification, the present embodiments have been described with reference to specific exemplary embodiments thereof. It will, however, be evident that various modifications and changes may be made thereto without departing from the broader spirit and scope of the disclosure as set forth in the appended claims. The specification and drawings are, accordingly, to be regarded in an illustrative sense rather than a restrictive sense. For example, method steps depicted in the flow charts of FIGS. 5A, 5B, 7, and 8 may be performed in other suitable orders and/or one or more method steps may be omitted.

What is claimed is:

1. A method of performing a ranging operation between a first wireless station (STA) and a second wireless STA, the method comprising:
   transmitting a request (REQ) frame from the first STA to the second STA;
   determining a time of departure (TOD) of the REQ frame;
   receiving an acknowledgement (ACK) frame from the second STA by the first STA, wherein the ACK frame includes a timestamp bit indicating whether the second STA captures timestamps;
   determining a TOA of the ACK frame at the first STA;
   when the timestamp bit indicates that the second STA does not capture timestamps, then determining a round trip time (RTT) value of the REQ frame and the ACK frame; and
   when the timestamp bit indicates that the second STA captures timestamps, then initiating an exchange of a number of measurement action frames and corresponding measurement acknowledgement frames between the second STA and the first STA to refine timing errors in the determined TOA by generating a number of half-RTT values between the second STA and the first STA, wherein each of the half-RTT values indicates a propagation time of a signal transmitted between the second STA and the first STA.

2. The method of claim 1, further comprising:
   determining a corrected RTT value between the first STA and the second STA by averaging the number of half-RTT values.

3. The method of claim 1, wherein the number of measurement action frames are timing synchronization frames.

4. The method of claim 1, wherein the first STA and the second STA remain on a same channel during the exchange of the number of measurement action frames and corresponding measurement acknowledgement frames.

5. The method of claim 1, wherein the second STA embeds, in each measurement action frame, a TOD of a prior measurement action frame sent to the first STA and a TOA of a prior measurement acknowledgement frame received from the first STA.

6. The method of claim 5, further comprising:
   estimating, in the second STA, a timing error associated with the TOA of the prior measurement acknowledgement frame; and
   determining a corrected TOA value by removing the timing error from the TOA of the prior measurement acknowledgement frame.

7. The method of claim 1, further comprising:
   estimating a timing error in the TOA of the ACK frame; and
   determining a corrected TOA of the ACK frame by removing the timing error from the TOA of the ACK frame.

8. A system for performing a ranging operation between a first wireless station (STA) and a second wireless STA, the system comprising:
   means for transmitting a request (REQ) frame from the first STA to the second STA;
   means for determining a time of departure (TOD) of the REQ frame;
   means for receiving an acknowledgement (ACK) frame from the second STA by the first STA, wherein the ACK frame includes a timestamp bit indicating whether the second STA captures timestamps;
   means for determining a TOA of the ACK frame at the first STA;
   means for determining a round trip time (RTT) value of the REQ frame and the ACK frame when the timestamp bit indicates that the second STA does not capture timestamps; and
   means for initiating an exchange of a number of measurement action frames and corresponding measurement acknowledgement frames between the second STA and the first STA to refine timing errors in the determined TOA by generating a number of half-RTT values between the second STA and the first STA when the timestamp bit indicates that the second STA captures timestamps, wherein each of the half-RTT values indicates a propagation time of a signal transmitted between the second STA and the first STA.

9. The system of claim 8, further comprising:
   means for determining a corrected RTT value between the first STA and the second STA by averaging the number of half-RTT values.

10. The system of claim 8, wherein the number of measurement action frames are timing synchronization frames.

11. The system of claim 8, wherein the first STA and the second STA remain on a same channel during the exchange of the number of measurement action frames and corresponding measurement acknowledgement frames.

12. The system of claim 8, wherein the second STA embeds, in each measurement action frame, a TOD of a prior measurement action frame sent to the first STA and a TOA of a prior measurement acknowledgement frame received from the first STA.

13. The system of claim 12, further comprising:
   means for estimating, in the second STA, a timing error associated with the TOA of the prior measurement acknowledgement frame; and
   means for determining a corrected TOA value by removing the timing error from the TOA of the prior measurement acknowledgement frame.

14. The system of claim 8, further comprising:
   means for estimating a timing error in the TOA of the ACK frame; and
   means for determining a corrected TOA of the ACK frame by removing the timing error from the TOA of the ACK frame.

15. A method of performing a ranging operation between a first wireless station (STA) and a second wireless STA, the method comprising:
   sending a request (REQ) frame from the first STA to the second STA;
   determining, in the first STA, a time of departure (TOD) of the REQ frame;

determining a time of arrival (TOA) of the REQ frame at the second STA;
determining a corrected TOA of the REQ frame based, at least in part, on a difference between a measured TOA of the REQ frame and an actual TOA of the REQ frame;
receiving an acknowledgement (ACK) frame from the second STA at the first STA;
determining a TOD of the ACK frame;
measuring, in the first STA, a TOA of the ACK frame at the first STA;
receiving the corrected TOA of the REQ frame and the TOD of the ACK frame from the second STA in a measurement action frame;
determining, in the first STA, a turn-around time (TAT) value of the second STA based, at least in part, on the corrected TOA of the REQ frame and the TOD of the ACK frame provided to the first STA by the second STA in the measurement action frame; determining a round trip time (RTT) value of the REQ frame and the ACK frame based, at least in part, on the TOD of the REQ frame, the TOA of the ACK frame, and the TAT value;
exchanging a sequence of a number of subsequent measurement action frames and associated measurement acknowledgement frames between the first STA and the second STA to generate a number of half-RTT values between the first STA and the second STA, wherein each of the half-RTT values indicates a propagation time of a signal transmitted between the second STA and the first STA; and
determining a corrected RTT value between the first STA and the second STA by averaging the number half-RTT values.

16. The method of claim 15, wherein the measurement action frame is a single timing synchronization frame.

17. The method of claim 15, wherein the TAT value is equal to the TOD of the ACK frame minus the TOA of the REQ frame.

18. The method of claim 15, further comprising:
estimating a timing error associated with the measured TOA of the REQ frame;
determining the corrected TOA of the REQ frame by subtracting the timing error from the measured TOA of the REQ frame; and
receiving the corrected TOA of the REQ frame from the second STA in a subsequent measurement action frame.

19. The method of claim 18, further comprising:
determining a corrected TAT value in response to the corrected TOA of the REQ frame received from the second STA.

20. The method of claim 15, further comprising:
estimating, in the first STA, a timing error associated with the measured TOA of the ACK frame;
determining a corrected TOA of the ACK frame by subtracting the timing error from the measured TOA of the ACK frame; and
determining, in the first STA, a corrected RTT value in response to the corrected TOA of the ACK frame.

21. The method of claim 15, wherein the sequence of the number of subsequent measurement action frames and the associated measurement acknowledgement frames exchanged between the first STA and the second STA is initiated by the second STA.

* * * * *